(12) United States Patent
Brensinger et al.

(10) Patent No.: US 12,270,219 B2
(45) Date of Patent: Apr. 8, 2025

(54) SLEEPING PAD WITH DUAL COATED BOTTOM SHEET AND CENTRAL LAYER

(71) Applicant: NEMO EQUIPMENT, INC., Dover, NH (US)

(72) Inventors: Camon Brensinger, Stratham, NH (US); Patrick McCluskey, Lee, NH (US); Wilson Sparberg Patton, Rye, NH (US)

(73) Assignee: Nemo Equipment, Inc., Dover, NH (US)

( * ) Notice: Subject to any disclaimer, the term of this patent is extended or adjusted under 35 U.S.C. 154(b) by 0 days.

(21) Appl. No.: 18/226,643

(22) Filed: Jul. 26, 2023

(65) Prior Publication Data
US 2024/0026705 A1    Jan. 25, 2024

Related U.S. Application Data

(60) Continuation of application No. 16/731,271, filed on Dec. 31, 2019, now abandoned, which is a division of
(Continued)

(51) Int. Cl.
*E04H 15/54* (2006.01)
*A47B 3/00* (2006.01)
(Continued)

(52) U.S. Cl.
CPC ............. *E04H 15/54* (2013.01); *A47B 3/002* (2013.01); *A47B 3/06* (2013.01); *A47B 3/0803* (2013.01);
(Continued)

(58) Field of Classification Search
CPC ......... E04H 15/54; E04H 15/42; A47B 3/002; A47B 3/06; A47B 3/0803; A47B 3/083;
(Continued)

(56) References Cited

U.S. PATENT DOCUMENTS

| | | | | |
|---|---|---|---|---|
| 1,610,898 A | * | 12/1926 | Steiner ................. | A47C 27/081 5/712 |
| 2,887,692 A | * | 5/1959 | Gosman ............... | A47C 27/081 297/DIG. 3 |

(Continued)

OTHER PUBLICATIONS

"Preparedness Pro" "Mylar the Magnificent _ Preparedness Pro", 2013-2014, pp. 12-13 (Year: 2013).
"The Airship Simon", 2007 p. 1 (Year: 2007).

*Primary Examiner* — Justin C Mikowski
*Assistant Examiner* — Luke Hall
(74) *Attorney, Agent, or Firm* — Hinckley Allen & Snyder

(57) ABSTRACT

An inflatable sleeping pad or air mattress comprises an inflatable pad having a top layer and a bottom layer. At least one middle layer is disposed parallel to the top and bottom layers, and supported between the top layer and the bottom layer by a plurality of support baffles, wherein a first plurality of support baffles is disposed between the at least one middle layer and the top layer, and a second plurality of support baffles disposed between the at least middle one layer and the bottom layer. The sleeping pad further comprises an air inlet/outlet valve disposed on at least one of the inflatable pad top or bottom layers.

15 Claims, 1 Drawing Sheet

Related U.S. Application Data application No. 15/878,989, filed on Jan. 24, 2018, now Pat. No. 10,524,563.

(60) Provisional application No. 62/449,818, filed on Jan. 24, 2017.

(51) Int. Cl.

| | |
|---|---|
| *A47B 3/06* | (2006.01) |
| *A47B 3/08* | (2006.01) |
| *A47B 3/083* | (2006.01) |
| *A47B 3/12* | (2006.01) |
| *A47B 13/00* | (2006.01) |
| *A47B 13/08* | (2006.01) |
| *A47B 37/04* | (2006.01) |
| *A47C 27/05* | (2006.01) |
| *A47C 27/14* | (2006.01) |
| *A47G 9/06* | (2006.01) |
| *A47G 9/08* | (2006.01) |
| *E04H 15/42* | (2006.01) |
| *F16B 12/44* | (2006.01) |

(52) U.S. Cl.
CPC ............... *A47B 3/083* (2013.01); *A47B 3/12* (2013.01); *A47B 13/003* (2013.01); *A47B 13/088* (2013.01); *A47B 37/04* (2013.01); *A47C 27/05* (2013.01); *A47C 27/14* (2013.01); *A47G 9/06* (2013.01); *A47G 9/086* (2013.01); *E04H 15/42* (2013.01); *F16B 12/44* (2013.01); *A47B 2003/0806* (2013.01); *A47B 2200/001* (2013.01); *A47B 2220/0072* (2013.01); *F16B 2012/446* (2013.01)

(58) Field of Classification Search
CPC ....... A47B 3/12; A47B 13/003; A47B 13/088; A47B 37/04; A47B 2003/0806; A47B 2200/001; A47B 2220/0072; A47C 27/05; A47C 27/14; A47G 9/06; A47G 9/086; F16B 12/44; F16B 2012/446
USPC ......................................................... 108/156
See application file for complete search history.

(56) References Cited

U.S. PATENT DOCUMENTS

| | | | | |
|---|---|---|---|---|
| 3,244,186 | A * | 4/1966 | Thomason | F24S 20/55 47/29.1 |
| 3,707,009 | A * | 12/1972 | Wagner | A47C 27/144 428/116 |
| 4,172,301 | A * | 10/1979 | Everard | A47C 27/087 156/290 |
| 4,425,676 | A * | 1/1984 | Crane | A61G 7/05746 5/689 |
| 4,705,717 | A * | 11/1987 | Cain | B32B 27/12 428/920 |
| 5,044,030 | A * | 9/1991 | Balaton | A47C 27/081 5/687 |
| 5,270,092 | A * | 12/1993 | Griffith | B32B 3/12 428/72 |
| 5,329,656 | A * | 7/1994 | Leggett | A47C 27/18 5/709 |
| 6,935,273 | B2 * | 8/2005 | Throndsen | A01K 1/0157 119/431 |
| 7,799,968 | B2 * | 9/2010 | Chen | B32B 29/00 604/377 |
| 8,656,539 | B1 * | 2/2014 | Boyd | A47C 27/087 5/713 |
| 2004/0194219 | A1 * | 10/2004 | Boso | A47C 27/082 5/711 |
| 2007/0044243 | A1 * | 3/2007 | Metzger | A47C 27/087 5/710 |
| 2011/0203783 | A1 * | 8/2011 | Blackford | A41D 31/065 165/185 |
| 2013/0340164 | A1 * | 12/2013 | Brensinger | A47C 27/10 5/420 |
| 2014/0237727 | A1 * | 8/2014 | Xia | A47C 27/087 5/711 |
| 2023/0284793 | A1 * | 9/2023 | Huang | A47C 27/087 |

\* cited by examiner

SLEEPING PAD WITH DUAL COATED BOTTOM SHEET AND CENTRAL LAYER

CROSS-REFERENCE TO RELATED APPLICATIONS

This application is a Continuation-in-part of U.S. patent application Ser. No. 16/731,271 titled "SLEEPING PAD WITH DUAL COATED BOTTOM SHEET AND CENTRAL LAYER", which was a Divisional Application of U.S. patent application Ser. No. 15/878,989 titled "SMALL TABLE FRAME", which was filed on Jan. 24, 2018 and claims priority from U.S. Provisional Patent Application No. 62/449,818 filed on Jan. 24, 2017 and titled "OUTDOOR EQUIPMENT 2016", which is incorporated fully herein by reference.]

TECHNICAL FIELD

The present invention relates to outdoor equipment, outdoor furniture, outdoor camping equipment and parts and fittings therefore, and more particularly, relates to the construction of an inflatable sleeping pad or mattress that provides an additional layer at the center of the pad to join the top and bottom baffle fabric and in which the bottom fabric layer is coated on both sides for ease of welding and repair.

BACKGROUND INFORMATION

A large portion of the population enjoy camping and other outdoor activities. When engaged in these activities, however, many people enjoy some of the comforts of home. Although individuals engaged in the activities enjoy such comforts of home, weight, space and collapsibility is still an important feature.

Campers and others who sleep away from a home or motel often desire to soften the ground or floor on which they sleep with a foam or air filled pad. Sleeping pads are widely used in the camping and outdoor arenas. Although foam sleeping pads are well-known, hikers and other remote campers are concerned with the weight they must carry and also the volume they must carry. Accordingly, some sleeping pads (such as foam sleeping pads) are much too large and bulky and not usable by hikers. Air filled (i.e. inflatable) sleeping pads are also widely known. Although air filled sleeping pads are generally lightweight and collapsible, they are often difficult to repair and are not tear and puncture resistant.

Accordingly, what is needed is an inflatable sleeping pad or mattress with a dual coated bottom sheet allowing electronic "welding" to the interior of the bottom sheet while also facilitating ease of repair in the field given the coating on the bottom or exterior of the bottom sheet, thus providing significant tear and puncture resistance and ease of repair.

SUMMARY

The present invention features an inflatable sleeping pad. The sleeping pad comprises an inflatable pad having a top layer and a bottom layer, wherein the top and bottom layers are disposed parallel to one another and have a length and a width.

The bottom layer includes an inside facing surface as well as an outside facing surface. Both the inside and outside facing surfaces of the bottom layer are coated with polyurethane either entirely or at least in some predetermined locations to allow spot welding of the bottom layer to one or more interior trusses or baffles. The inside facing surface is coated with polyurethane to facilitate the welding between the inside surface of the bottom layer and the baffles or trusses as will be explained in greater detail below in connection with a second embodiment. The outside facing surface is coated to facilitate field repair of punctures with a self-adhesive patch that can cure to 80% or more a full strength in just minutes, making the inflatable sleeping pad usable immediately in the case of a care or puncture.

The top layer also includes an inside facing surface and an outside facing surface. The inside facing surface of the top layer is also coated either entirely or in selected predetermined areas with polyurethane to facilitate the welding of the inside surface of the top layer to baffles or trusses as will be explained in greater detail below.

In a preferred embodiment, the sleeping pad further comprises at least one middle layer constructed of a first material having a length and a width and disposed parallel to the top and bottom layers, and wherein the at least one middle layer is supported between the top layer and the bottom layer. In this embodiment, the sleeping pad further comprises a plurality of support baffles, wherein a first plurality of support baffles is disposed between the at least one middle layer and the top layer, and a second plurality of support baffles disposed between the at least middle one layer and the bottom layer. The sleeping pad in all embodiments includes an air inlet/outlet valve disposed on at least one of the inflatable pad top or bottom layers.

In one embodiment, the first and second plurality of support baffles may be truss support baffles, attached at predetermined locations between the top layer, the middle layer, and the middle layer and the bottom layer.

In the preferred embodiment, the first and second plurality of truss support baffles are made of a heat weldable material and are spot welded at predetermined locations between the top layer, the middle layer, and the bottom layer. In this embodiment, the interior facing surfaces of the top and bottom layers include at least a plurality of heat weldable regions.

In one each embodiment, the at least one middle layer is constructed of a non-heat weldable material, and includes a plurality of openings such that the first plurality of truss baffles are welded at predetermined points directly to predetermined regions of the second plurality of truss baffles through the plurality of openings in the at least one middle layer.

The at least one middle layer is preferably constructed of a thermal energy reflective material. In one example, the middle layer is a mylar coated aluminum sheet.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Closely related to an air mattress, an inflatable pad requires an external pressure source to inflate, typically in the form of a pump or by blowing orally. Convection of the air inside the mattress from a bottom surface typically against a cold and/or wet ground to the top surface against which a user sleeps reduces the amount of insulation the air mattress provides. One method of reducing convection is by partitioning the internal cavity between the top and bottom sheets or by filling the cavities with material to trap the air such as down feathers or synthetic insulation. Manually inflated pads have the advantage of offering good thickness and a great deal of comfort while being lightweight and able to pack to a small size.

Figure 1:
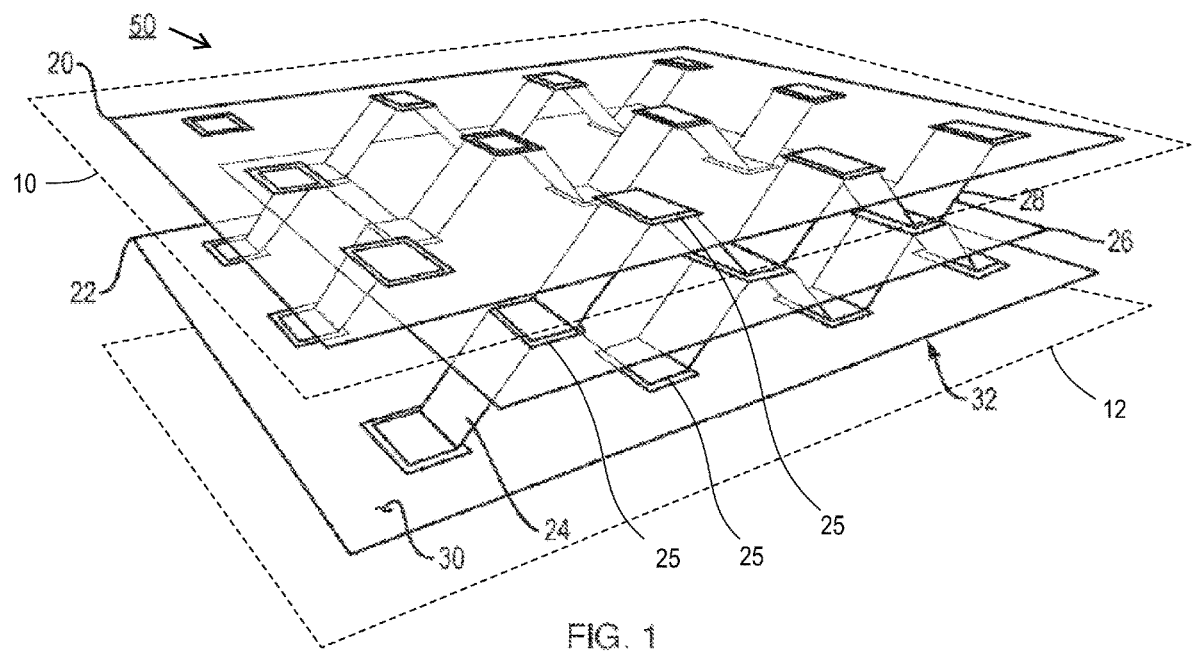
FIG. 1 illustrates a double layer pad construction providing an additional weld at the center of the pad that joins the top and bottom baffle fabrics.

Accordingly, the feature of the present invention is a construction technique for inflatable sleeping pads 50 and the like which provides one or more additional sheet 26 at the center of the pad that joins the top 20 and bottom 22 sheets to a series of internal baffles 24, 28, see FIG. 1, in order to stop or lessen convection that would tend to make the pad less effective at insulating the user from cold, damp surfaces on which the air mattress 50 is placed. The purpose of the center weld is to create a structure that can support an additional layer of material 26 in the center of the pad. One possible construction consist of 3 layers of coated mylar; a top layer 20 supported by baffles 28; a central layer 26 supported in the center of the pad or mattress 50 by both a top baffle layer 28 and a bottom baffle layer 24; and a bottom layer 22 of the pad held in place by bottom baffles 24 welded to the interior surface 30 of the bottom sheet 22. The purpose of this construction is to create smaller air cells within the pad to reduce convective heat transfer and to add an additional layer of IR reflective material (central layer 26) to reduce radiant heat loss from the user to the surface on which the air mattress or pad is placed.

Figure 2:
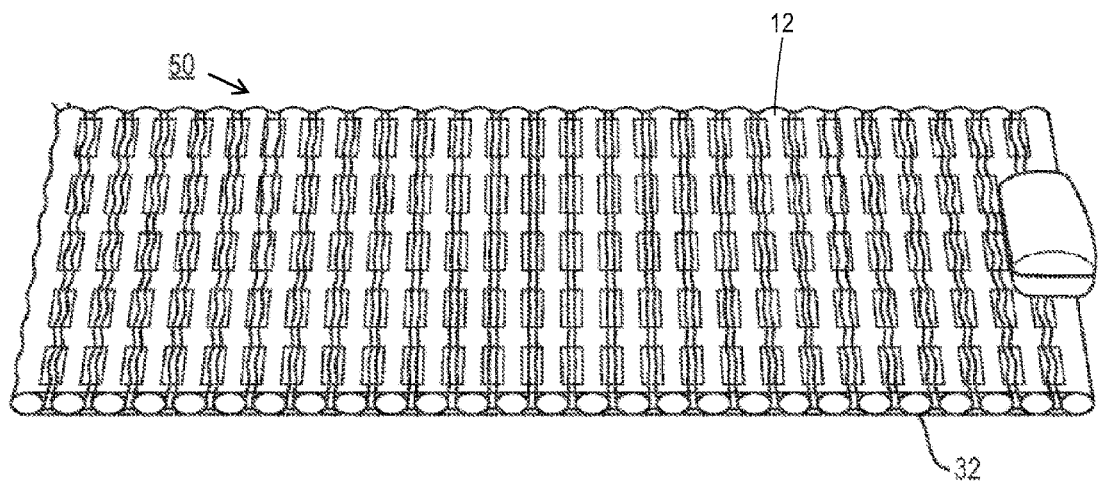
FIG. 2 illustrates an inflatable pad having a bottom sheet of fabric that is coated on both sides with polyurethane to facilitate field repairs and internal welding.

An additional feature of this embodiment of the present invention features providing a bottom sheet of fabric 22 on an inflatable air pad or the like, that is coated on both sides (interior and exterior) with polyurethane, FIG. 2. The inside facing surface 30 is coated with polyurethane either in its entirety or at least in selected predetermined areas to facilitate welding to the baffles 24 while the outside facing surface 32 is coated generally entirely to facilitate field repair of punctures with a quick curing self-adhesive patch. A repair of a standard vinyl air pad that is not coated with polyurethane or a similar substance takes about 24 hours to cure and be usable. However, a standard repair kits such as "tear-aid" brand patches reach 80% of their full strength in just minutes making the pad usable almost immediately and certainly that night.

The sleeping pad 50, in accordance with an embodiment of the present invention, is described in more elaboration hereinafter with respect to FIGS. 1 and 2. The inflatable sleeping pad 50 comprises an inflatable pad having a top layer 20 and a bottom layer 22, wherein the top and bottom layers 20, 22 are disposed parallel to one another and have a length and a width. The sleeping pad 50 further comprises at least one middle layer 26 constructed of a first material having a length and a width and disposed parallel to the top and bottom layers 20, 22. The middle layer 26 is supported between the top layer and the bottom layer 20, 22. The sleeping pad further comprises a plurality of support baffles, wherein a first plurality of support baffles 28 is disposed between the at least one middle layer 26 and the top layer 20, and a second plurality of support baffles 24 is disposed between the at least middle one layer 26 and the bottom layer 22. The sleeping pad 50 further comprises an air inlet/outlet valve 34 disposed on at least one of the inflatable pad top or bottom layers.

In one embodiment, the first and second plurality of support baffles 24, 28 are truss support baffles, attached at predetermined locations between the top layer 20, the middle layer 26, and the bottom layer 22. In one example, the first and second plurality of truss support baffles are made of a heat weldable material and are spot welded at predetermined locations between the top layer 20, the middle layer 26, and the bottom layer 22.

In a non-limiting embodiment, the top and bottom layers 20, 22 each include an interior facing surface, and wherein each of the interior facing surfaces of the top and bottom layers include at least a plurality of heat weldable regions. Furthermore, the at least one middle layer 26 includes a plurality of openings 25. Predetermined regions of the first plurality of truss baffles 28 are welded at predetermined points directly to predetermined regions of the second plurality of truss baffles 24 through the plurality of openings 25 in the at least one middle layer 26.

In an alternative embodiment, the at least one middle layer 26 may be heat weldable and therefore may not include a plurality of openings. The at least one middle layer 26 is preferably constructed of a thermal energy reflective material. In one example, the middle layer 26 is a mylar coated aluminum sheet and thus not heat weldable and therefore the provision of a plurality of openings 25 facilitates the welding of first and second trusses 24, 28 directly to one another through the openings.

Accordingly, the present invention provides a novel and nonobvious air mattress including the features of a bottom layer having polyurethane coating on both the interior and exterior surfaces to facilitate heat welding to the interior surface of the bottom layer and tear or puncture repair on the exterior surface of the bottom layer. One or more middle layers, preferably heat reflective layer, is provided in the Central region of the air mattress and supported by first and second layers of trusses which suspend or support the middle layer between the bottom layer and the top layer, to reduce convective air currents within the interior of the air mattress thereby preventing heat from a user's body from escaping to the ground or other cold surface on which the air mattress is placed.

Modifications and substitutions by one of ordinary skill in the art are considered to be within the scope of the present invention, which is not to be limited except by the allowed claims and their legal equivalents.

The invention claimed is:

1. An inflatable sleeping pad comprising:
an inflatable pad having a top layer and a bottom layer, said top and bottom layers disposed parallel to one another and having a length and a width;
a middle layer constructed of a first material having a length and a width and disposed between and parallel to said top and bottom layers, and wherein said middle layer is supported between the top layer and the bottom layer, and wherein said middle layer includes a plurality of openings; and
a plurality of support baffles, a first plurality of support baffles disposed between the middle layer and the top layer, and a second plurality of support baffles disposed between the middle layer and the bottom layer, and wherein predetermined regions of said first plurality of truss baffles are welded at predetermined points directly to predetermined regions of said second plurality of truss baffles through said plurality of openings in said middle layer.

2. The inflatable sleeping pad according to claim 1, wherein the first and second plurality of support baffles are truss support baffles, attached at predetermined locations between the top layer, the middle layer, and the bottom layer.

3. The inflatable sleeping pad according to claim 2, wherein said first and second plurality of truss support baffles are made of a heat weldable material and are spot welded at predetermined locations between the top layer, the middle layer, and the bottom layer.

4. The inflatable sleeping pad according to claim 1, wherein said top and bottom layers each include an interior facing surface, and wherein each of said interior facing surfaces of said top and bottom layers include at least a plurality of heat weldable regions.

5. The inflatable sleeping pad according to claim 2, wherein said at least one middle layer is not heat weldable.

6. The inflatable sleeping pad according to claim 2, wherein the at least one middle layer is constructed of a thermal energy reflective material.

7. An inflatable sleeping pad comprising:
an inflatable pad having a top layer and a bottom layer, said top and bottom layers disposed parallel to one another and having a length and a width, wherein said top and bottom layers each include an interior facing surface, and wherein each of said interior facing surfaces of said top and bottom layers include at least a plurality of heat weldable regions;
at least one middle layer constructed of a thermal energy reflective material having a length and a width and disposed parallel to said top and bottom layers, and wherein said at least one middle layer is supported between the top layer and the bottom layer and comprises a plurality of openings; and
a plurality of truss support baffles constructed of a heat weldable material, a first plurality of truss support baffles disposed between the at least one middle layer and said interior facing surface of the top layer, and a second plurality of truss support baffles disposed between the at least middle layer and the interior facing surface of the bottom layer, wherein said first and second plurality of truss support baffles are spot welded at predetermined locations between the top layer, the middle layer, and the bottom layer, and wherein predetermined regions of said first plurality of truss baffles are welded at predetermined points directly to predetermined regions of said second plurality of truss baffles through said plurality of openings in said at least one middle layer.

8. The inflatable sleeping pad according to claim 7, wherein the middle layer is a mylar coated aluminum sheet.

9. The inflatable sleeping pad according to claim 2, wherein the bottom layer is coated with polyurethane on at least predetermined regions of an inner surface and generally entirely on an outer surface thereof.

10. The inflatable sleeping pad according to claim 7, wherein the middle layer is a mylar coated aluminum sheet.

11. The inflatable sleeping pad according to claim 7, wherein the first plurality of baffles is spot welded between the top layer and the middle layer, and the second plurality of baffles is spot welded between the middle layer and the bottom layer.

12. The inflatable sleeping pad according to claim 7, wherein the bottom layer is coated with a polyurethane coating on an inner surface and an outer surface thereof.

13. An inflatable sleeping pad comprising:
an inflatable pad having a top layer and a bottom layer, said top and bottom layers disposed parallel to one another and having a length and a width, wherein said top and bottom layers each include an interior facing surface, and wherein said interior facing surface of said top layer includes at least a plurality of heat weldable regions, and wherein the interior facing surface of said bottom layer is coated with a polyurethane coating on said interior facing surface and on an outer surface thereof;
a middle layer constructed of a thermal energy reflective material having a length and a width and disposed parallel to said top and bottom layers, and wherein said middle layer is supported between the top layer and the bottom layer and comprises a plurality of openings; and
a plurality of truss support baffles constructed of a heat weldable material, a first plurality of truss support baffles disposed between the at least one middle layer and the interior facing surface of said top layer, and a second plurality of truss support baffles disposed between the at least middle layer and the interior facing surface of said bottom layer, wherein said first and second plurality of truss support baffles are spot welded to each other at predetermined locations between the top layer, the middle layer, and the bottom layer, and wherein said first plurality of truss baffles are welded at predetermined points directly to said second plurality of truss baffles through said plurality of openings in said middle layer.

14. The inflatable sleeping pad according to claim 13, wherein the first plurality of baffles is spot welded between the top layer and the middle layer, and the second plurality of baffles is spot welded between the middle layer and the bottom layer.

15. An inflatable sleeping pad comprising:
a top layer;
a bottom layer;
a middle layer disposed between the top layer and the bottom layer and having a plurality of openings extending therethrough;
a first plurality of truss baffles disposed between the top layer and the middle layer, each of said first plurality of truss baffles having a first predetermined welding point and a second predetermined welding point spaced from the first predetermined welding point; and
a second plurality of truss baffles disposed between the middle layer and the bottom layer, each of said second plurality of truss baffles having a first predetermined welding point and a second predetermined welding point spaced from the first predetermined welding point;
wherein said top layer, bottom layer, and middle layer are arranged substantially parallel to one another;
wherein the first predetermined welding spots of the first and second plurality of truss baffles are welded to the top and bottom layers, respectively; and
wherein each second predetermined welding spot of each of the first plurality of truss baffles is welded to a second predetermined welding spot of a second truss baffle through an opening of the middle layer.

* * * * *